W. G. KLUSSMAN.
POULTRY FOUNTAIN.
APPLICATION FILED SEPT. 25, 1911.
1,023,658.
Patented Apr. 16, 1912.
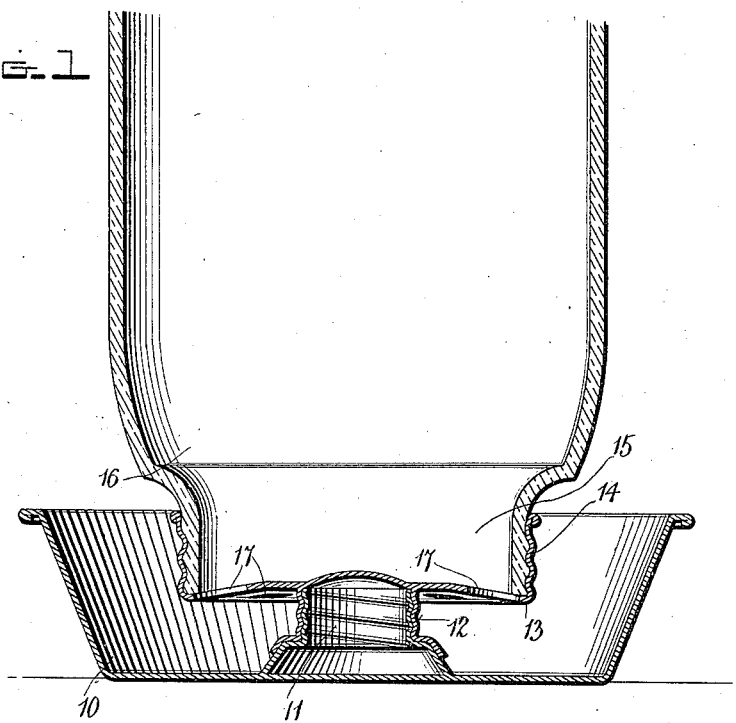
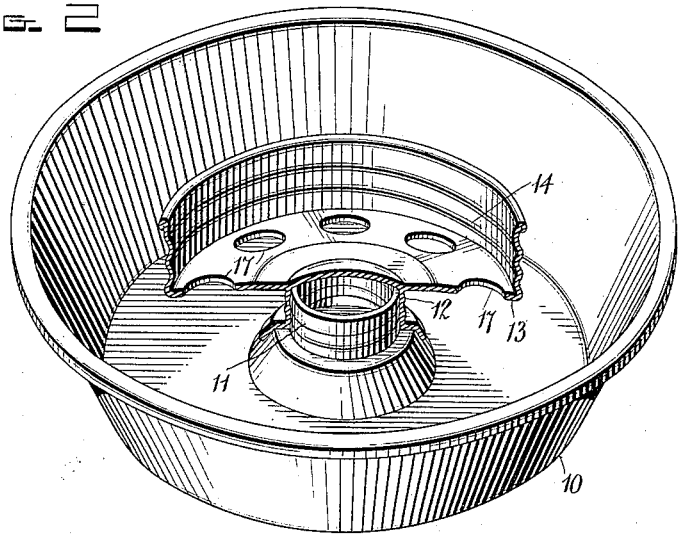
Witnesses
Inventor
W. G. Klussman,
By
Attorneys

UNITED STATES PATENT OFFICE.

WILLIAM G. KLUSSMAN, OF IRVING, OREGON.

POULTRY-FOUNTAIN.

1,023,658.   Specification of Letters Patent.   Patented Apr. 16, 1912.

Application filed September 25, 1911. Serial No. 651,156.

*To all whom it may concern:*

Be it known that I, WILLIAM G. KLUSSMAN, a citizen of the United States, residing at Irving, in the county of Lane, State of Oregon, have invented certain new and useful Improvements in Poultry-Fountains; and I do hereby declare the following to be a full, clear, and exact description of the invention, such as will enable others skilled in the art to which it appertains to make and use the same.

This invention relates to poultry fountains.

The object of the invention resides in the provision of a poultry fountain which is capable of maintaining a continuous supply of water in a sanitary condition and of automatically feeding the water as it is consumed by the poultry.

A further object of the invention resides in the provision of a poultry fountain in which the various parts thereof may be easily detached one from the other so as to permit same to be thoroughly cleaned when desired.

With the above and other objects in view the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a vertical section of a poultry fountain constructed in accordance with the invention, and Fig. 2, a detail perspective view of same partly in section and with the water receptacle or jar removed.

Referring to the drawings the fountain is shown as comprising a pan 10 which has fixed thereto and rising from the central portion of its bottom a threaded tubular neck 11. Adapted to be screwed upon the neck 11 is a threaded socket member 12 which depends from and is fixed to an inverted cap 13 of the type utilized in closing jars of the Mason type and includes the usual threaded flange 14 in which is screwed the threaded neck 15 of an ordinary Mason jar 16. The crown of the cap 12 is provided with a plurality of openings 17 surrounding the socket member 12 through which water passes from the jar 16 to the pan 10.

In use the cap 13 is screwed upon the neck 11 through the medium of the threaded socket member 12. The jar 16 is then filled with water and the cap 13 screwed upon the neck 15 of the jar with the latter in upright position and the pan 10 inverted. When the jar and pan are in this relation it will be noted that the outer edge of the neck 15 extends inward of the upper edge of the pan 10. The jar 16 is then inverted and the pan 10 seated upon its base so as to support the jar as will be apparent. The water in the jar 16 will then flow until the level of the water in the pan 10 reaches the plane of the outer edge of the neck 15 of the jar when the flow of water from the jar to the pan will cease. As the water is consumed from the pan 10 by the poultry it will be automatically fed to the pan from the jar 16 so as to maintain the level of the water in the pan in the plane of the outer edge of the neck 15 of the jar. This automatic feeding of water from the jar to the pan will continue until the entire quantity of water in the jar has been fed to the pan.

From the foregoing description taken in connection with the drawings it will be apparent that there has been provided a poultry fountain in which the various parts may be easily taken apart for cleansing and which will maintain a continuous supply of water in a sanitary condition and feed said water automatically as it is consumed by the poultry. It will also be noted that the crown of the cap 13 is concaved so that when said cap is inverted the crown will be inclined from its center toward its outer edge. This construction is useful when the device is used to constantly supply heavy foods, as such foods, by reason of this inclination will be discharged slightly toward the side wall of the pan 10 and thereby be within easy reach of the fowl.

What is claimed is:

A poultry fountain comprising a pan having a bottom, an upwardly extending wall, a threaded neck fixed to and rising from the central portion of the bottom of the pan, an inverted screw cap, a threaded socket depending from the inverted screw cap and detachably secured to said threaded neck, said screw cap having its crowned portion disposed below the plane of the upper edges of the wall of the pan and provided with an outlet opening, and a jar having its open end in detachable threaded engagement with the screw cap.

In testimony whereof, I affix my signature, in presence of two witnesses.

WILLIAM G. KLUSSMAN.

Witnesses:
S. L. BOND,
BENTON WISCARSON.

---

Copies of this patent may be obtained for five cents each, by addressing the "Commissioner of Patents, Washington, D. C."